United States Patent
Droux et al.

(10) Patent No.: US 10,567,250 B2
(45) Date of Patent: Feb. 18, 2020

(54) END-TO-END TRACING PROVIDERS AND SESSION MANAGEMENT

(71) Applicant: Oracle International Corporation, Redwood Shores, CA (US)

(72) Inventors: Nicolas G. Droux, Albuquerque, NM (US); Jiayao Hu, Milpitas, CA (US); Anders D. Persson, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 136 days.

(21) Appl. No.: 15/271,332

(22) Filed: Sep. 21, 2016

(65) Prior Publication Data

US 2018/0083849 A1   Mar. 22, 2018

(51) Int. Cl.
G06F 15/173 (2006.01)
H04L 12/26 (2006.01)
H04L 29/08 (2006.01)

(52) U.S. Cl.
CPC ............ H04L 43/06 (2013.01); H04L 43/026 (2013.01); H04L 67/14 (2013.01); *H04L 43/106* (2013.01)

(58) Field of Classification Search
CPC ....... H04L 43/06; H04L 43/10; H04L 43/026; H04L 67/14; H04L 43/106; H04L 43/12; G06F 11/3636; G06F 11/364; G06F 11/3644

See application file for complete search history.

(56) References Cited

U.S. PATENT DOCUMENTS

| | | | | |
|---|---|---|---|---|
| 7,475,386 | B1* | 1/2009 | Shapiro | G06F 11/3644 717/128 |
| 2002/0071530 | A1* | 6/2002 | Hannigan | H04M 3/2281 379/88.19 |
| 2004/0121775 | A1* | 6/2004 | Ropolyi | H04L 63/00 455/445 |
| 2005/0021708 | A1* | 1/2005 | Raghuraman | G06Q 10/10 709/223 |
| 2005/0033777 | A1* | 2/2005 | Moraes | G06F 17/30575 |
| 2005/0276386 | A1* | 12/2005 | Ethier | H04L 43/00 379/32.05 |
| 2007/0180439 | A1* | 8/2007 | Sundararajan | G06F 11/3644 717/158 |
| 2008/0127110 | A1* | 5/2008 | Ivanov | G06F 11/3476 717/128 |

(Continued)

OTHER PUBLICATIONS

"X-Trace: A Pervasive Network Tracing Framework," Rodrigo Fonseca et al., Apr. 11, 2007 (14 pages).

*Primary Examiner* — Cheikh T Ndiaye
(74) *Attorney, Agent, or Firm* — Ferguson Braswell Fraser Kubasta PC

(57) ABSTRACT

A method for end-to-end tracing includes receiving, from a user node, a request for a tracing session, receiving an argument and a provider identifier for the tracing session, and initiating tracing on compute nodes by sending the argument to a provider identified by the provider identifier, the provider located on each of the compute nodes. The method further includes receiving event reports from the compute nodes, and combining the event reports into a tracing information for the tracing session. The method further includes sending the tracing information to the user node.

19 Claims, 8 Drawing Sheets

(56) References Cited

U.S. PATENT DOCUMENTS

| | | | |
|---|---|---|---|
| 2010/0128623 A1* | 5/2010 | Dunn | H04L 29/12952 370/252 |
| 2012/0089966 A1* | 4/2012 | Martin | G06F 11/3466 717/133 |
| 2014/0310561 A1* | 10/2014 | Zhang | G06F 11/3636 714/38.1 |
| 2016/0197799 A1* | 7/2016 | Clemm | H04L 43/06 709/202 |

* cited by examiner

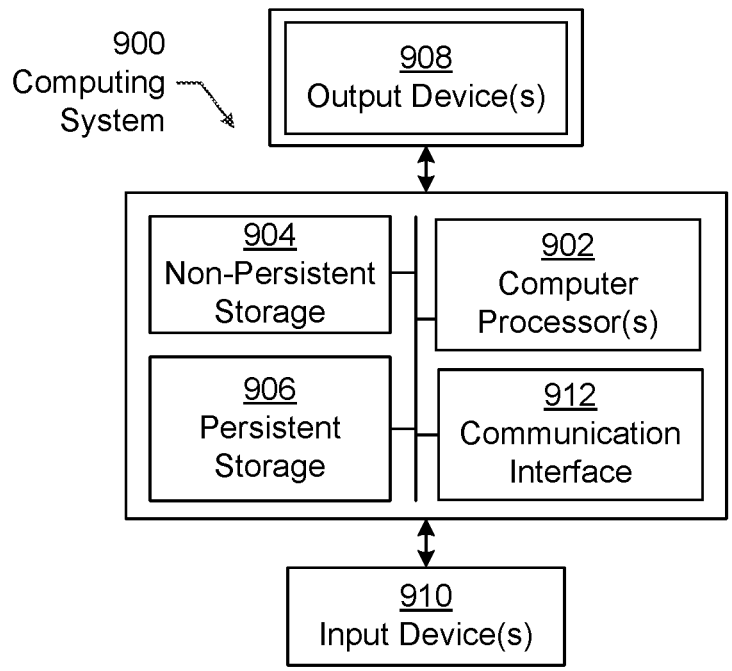
FIG. 9.1
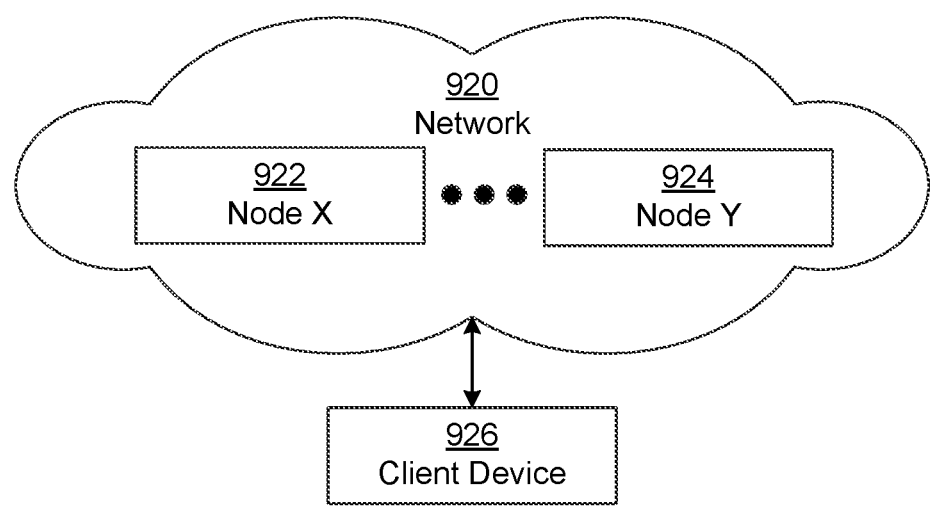
FIG. 9.2

US 10,567,250 B2

END-TO-END TRACING PROVIDERS AND SESSION MANAGEMENT

CROSS-REFERENCE TO RELATED APPLICATIONS

This application includes subject matter related to U.S. patent application Ser. No. 14/983,014 filed on Dec. 29, 2015, and entitled "Determining the Causation of Events Across Multiple Nodes Using Message Properties." U.S. patent application Ser. No. 14/983,014 is incorporated herein by reference in its entirety.

BACKGROUND

In order to gain information related to the function, performance, etc. of devices and applications (e.g., computing devices, network devices, storage devices, etc.), tracing may be performed. For example, if a computer program fails in some way, the instruction executed at the time of failure, as well as instructions executed before and/or after that time of failure may be useful in preventing or lessening future occurrence of the failure. Tracing is a process of recording information about the execution of a running system.

SUMMARY

In general, in one aspect, one or more embodiments relate to a method for end-to-end tracing. The method includes receiving, from a user node, a request for a tracing session, receiving an argument and a provider identifier for the tracing session, and initiating tracing on compute nodes by sending the argument to a provider identified by the provider identifier, the provider located on each of the compute nodes. The method further includes receiving event reports from the compute nodes, and combining the event reports into a tracing information for the tracing session. The method further includes sending the tracing information to the user node.

In general, in one aspect, one or more embodiments relate to a system for end-to-end tracing. The system includes a computer processor, a data repository for storing provider lists, and instructions. The instructions cause the computer processor to receive, from a user node, a request for a tracing session, receive an argument and a provider identifier for the tracing session, and initiate tracing on compute nodes by sending the argument to a provider identified by the provider identifier. The provider is located on each of the compute nodes. The instructions further cause the computer processor to receive event reports from the compute nodes, combine the event reports into a tracing information for the tracing session, and send the tracing information to the user node.

In general, in one aspect, one or more embodiments relate to a non-transitory computer readable medium for end-to-end tracing. The non-transitory computer readable medium includes computer readable program code for receiving, from a user node, a request for a tracing session, receiving an argument and a provider identifier for the tracing session, initiating tracing on compute nodes by sending the argument to a provider identified by the provider identifier, the provider located on each of the compute nodes. The non-transitory computer readable medium further includes computer readable program code for receiving event reports from the compute nodes, combining the event reports into a tracing information for the tracing session, and sending the tracing information to the user node.

Other aspects of the invention will be apparent from the following description and the appended claims.

BRIEF DESCRIPTION OF DRAWINGS

FIGS. 9.1 and 9.2 show a computing system in accordance with one or more embodiments of the invention.

DETAILED DESCRIPTION

Figure 1:
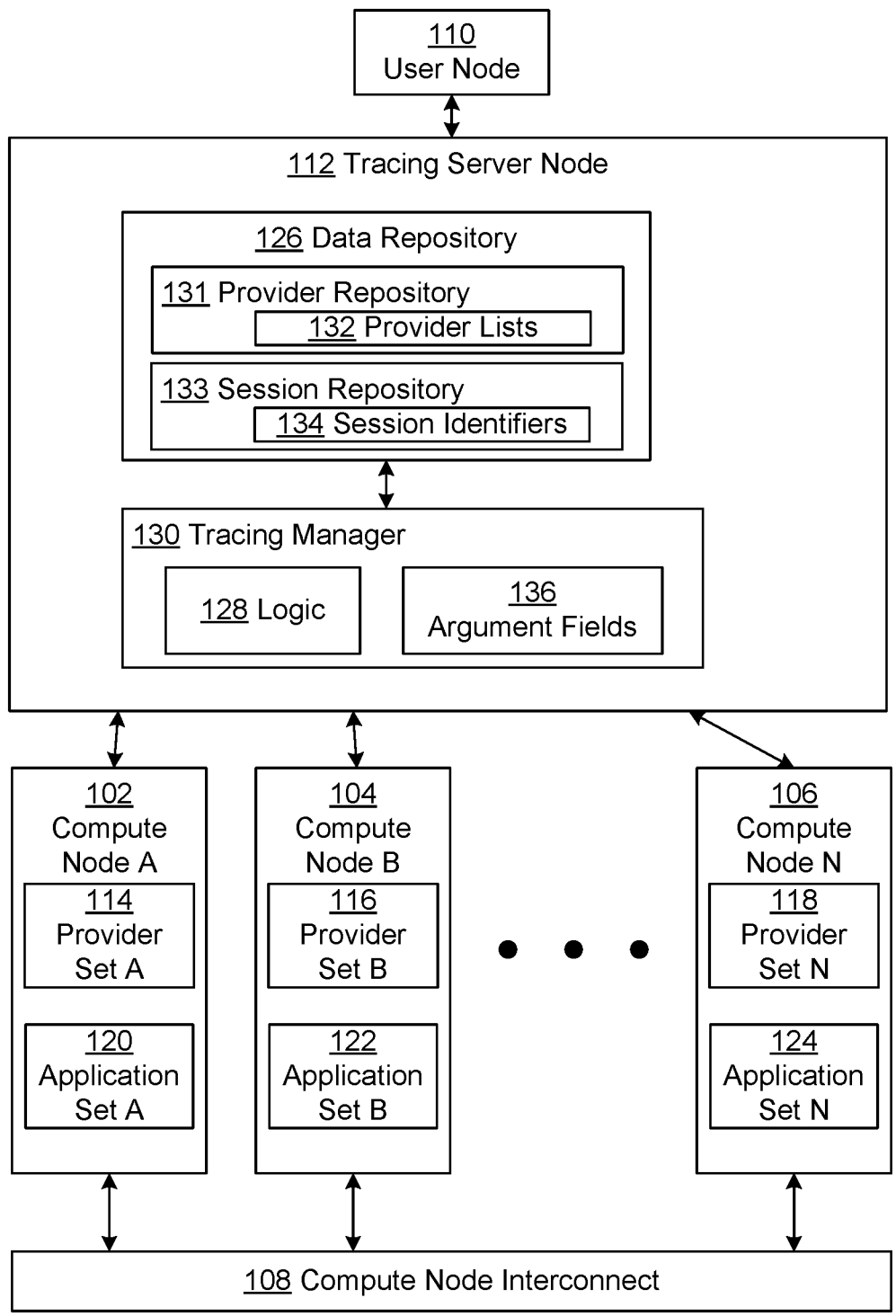
FIGS. 1, 2, 3, and 4 show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements. Further, for the purposes of this application, a first component is local with respect to a second component when the first component is on the same node as the second component.

In general, embodiments of the invention are directed to performing end to end tracing and session management using providers. The end-to-end tracing spans multiple compute nodes, each compute node having set of one or more providers. The providers include functionality to initiate tracing on their respective local compute nodes. A tracing server node is connected to the providers and is configured to trigger the providers to perform the tracing. Thus, by connecting only to the tracing server node, one or more embodiments allow a user to trigger end-to-end tracing across multiple nodes.

FIGS. 1, 2, 3, and 4 show schematic diagrams in accordance with one or more embodiments of the invention. Turning to FIG. 1, FIG. 1 shows a system in accordance with one or more embodiments of the invention.

As shown in FIG. 1, the system includes compute nodes (e.g., compute node A (102), compute node B (104), compute node C (106)), a compute node interconnect (108), and a tracing server node (112). The system may further include or be connected to a user node (110). Each of these components is discussed below.

Figure 2:
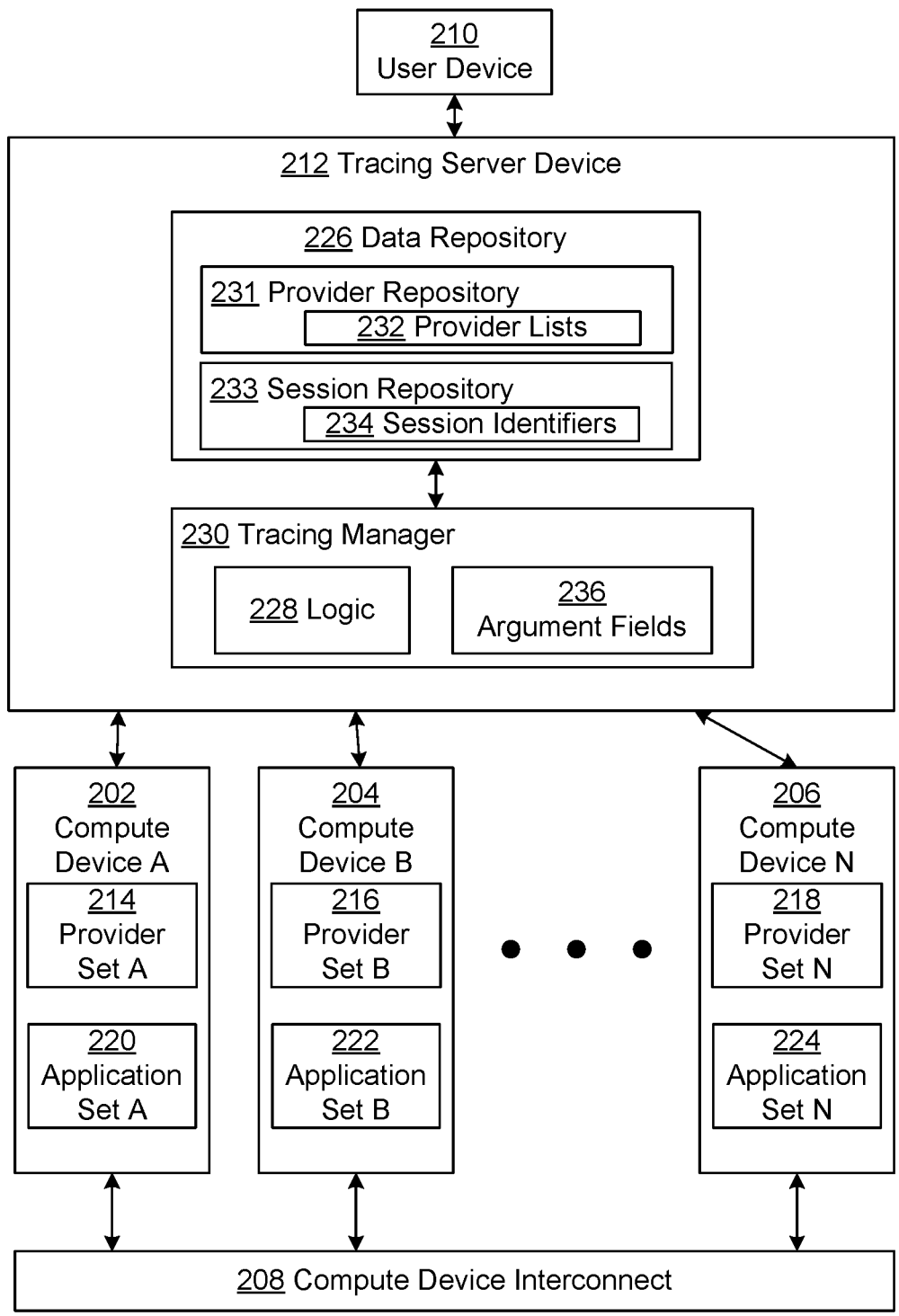
Figure 3:
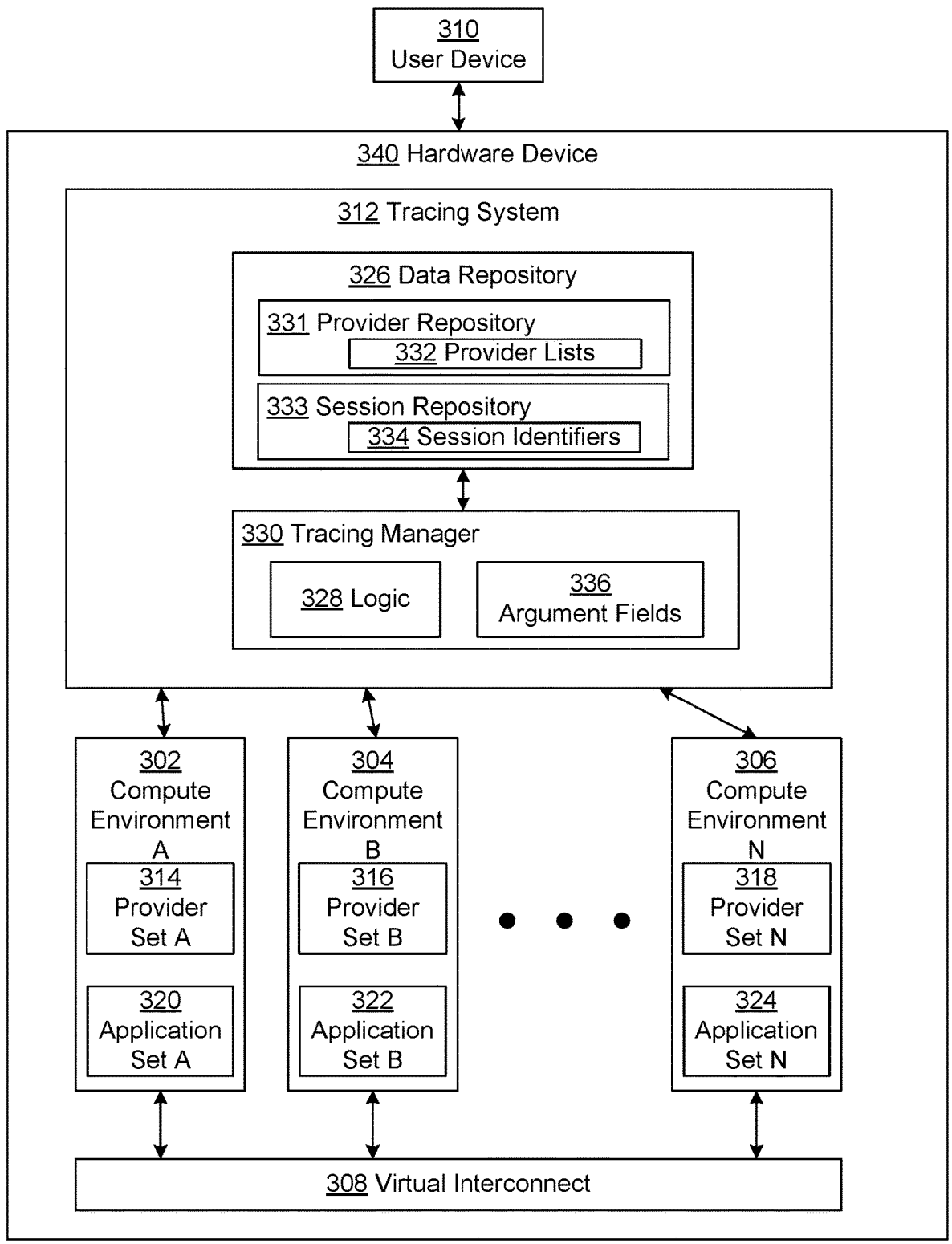

In general, a node is hardware, software, and/or firmware that provides an execution environment for firmware and/or software executing on the node. For example, the node may be a physical computing device, a hardware partition of a physical computing device, a virtual machine, or another execution environment. FIG. 2 shows a schematic diagram in which the nodes are physical computing devices. FIG. 3 shows a schematic diagram in which the nodes are virtual environments. In one or more embodiments of the invention, a node includes functionality to transmit messages to and receive messages from any number of other nodes. In one or more embodiments of the invention, a message (not shown) is any information arranged according to any protocol for transmission between nodes. Types of messages include, but are not limited to, a HTTP request/response, a TCP packet, an IP packet, a MAC frame, an NFS request/response, a request to read data from or write data to a storage device, and/or any other type of data transmission between nodes.

A compute node (e.g., compute node A (102), compute node B (104), compute node C (106)) is a node that includes functionality to execute applications being traced. In particular, a compute node executes the target of the tracing. Each compute node includes an application set (e.g., application set A (120), application set B (122), application set C (124)). The application set is a set of one or more software applications that is configured to execute on the compute node (e.g., compute node A (102), compute node B (104), compute node C (106)). The applications in application sets different nodes may be instances of the same or different applications. Further, applications in the same application set may be heterogeneous with respect to programming language in which the application is developed, the tracing enabled for the application, other characteristics of the application, or any combination thereof. The application set defines the functionality of the compute node. For example, the compute node may be a switch, a storage server, a web server, an application server, a firewall or another type of node.

Although not shown in FIG. 1, each compute node may include one or more agents (not shown). An agent is a software component that executes the code being traced. For example, an agent may be an application, an implementation of a protocol, a layer of a network or storage software stack, a kernel module, etc. Agents are described in U.S. patent application Ser. No. 14/983,014. In one or more embodiments of the invention, one or more agents may execute on a compute node to monitor events, generate event reports, transmit event reports to a tracing server, etc.

A node may include or be operatively connected to any number of executing agents for monitoring and/or tracing events that occur on a node, as well as for transmitting one or more event reports to a tracing server node (112). In one or more embodiments of the invention, any node, or any portion thereof, may be monitored by an agent and may include additional components for initiating and/or performing a trace. For example, user applications, device drivers, etc. may be instrumented (i.e., code is inserted). Additionally, one or more tracing components (e.g., Dtrace, C language application programming interfaces (APIs), etc.) may be included in or operatively connected to a node, one or more buffers for storing event reports may be included in or operatively connected to a node, and/or one or more probes (e.g., implemented in instrumented code) may be configured to trigger (i.e., begin tracing an event) when certain actions occur. For example, a probe may be included in code for sending TCP messages, and when triggered may execute tracing functions written to perform certain actions.

In one or more embodiments of the invention, when an event occurs on a node, an event report (not shown) is created. In one or more embodiments of the invention, an event report may include details related to an event. For example, such details may include, but are not limited to, a trace identifier, an event identifier, information related to one or more ancestor event identifiers, and a timestamp. In one or more embodiments of the invention, an ancestor event is an event that occurred before an event, is causally related, either indirectly or directly, to the event, and occurred on the same or different node as the event. In one or more embodiments of the invention, an identifier is any information that may be used to distinctly identify a given piece of information in a given context. For example, within a given node, each causally related event may be associated with an event identifier for the event. As another example, an ancestor event identifier may be the event identifier of an ancestor event.

Continuing with the compute nodes (e.g., compute node A (102), compute node B (104), compute node C (106)), the compute nodes include provider sets (e.g., provider set A (114), provider set B (116), provider set C (118)). Each provider set is a set of one or more providers. A provider is hardware, software, and/or firmware that includes functionality to initiate tracing on the local compute node (i.e., the same compute node as the provider). A provider is a collection of metadata and tracing code that includes functionality to interface with a tracing server node (112) (discussed below) and trace particular software code. The provider may leverage traces generated by one or more agents. In one or more embodiments, each provider may be specific to a type of tracing (e.g., particular to the software code traced and the type of statistics gathered) and/or tracing component. Providers in the different provider sets may be the same or different. For example, compute node A (126) may have provider set A (114) that is different and potentially overlapping with provider set B (116) on compute node B (104). Thus, some of the providers on compute node A (126) may be instances of the same providers as on compute node B (104), while other providers may be different. Each provider has a corresponding provider identifier that is common across the instances of the provider and uniquely identifies the provider. Providers are discussed in further detail in FIG. 4.

Continuing with FIG. 1, compute nodes (e.g., compute node A (102), compute node B (104), compute node N (106)) are configured to be communicatively coupled to a compute node interconnect (108). Configured to be communicatively connected means that during operation the nodes are via hardware and/or software configured to communicate. The connection may be permanent, semi-permanent, or temporary, direct or indirect, and shared or dedicated. In other words, at least during operation, the compute nodes may communicate through the compute node interconnect with other compute nodes. The compute node interconnect (108) is hardware and/or software mechanism for connecting compute nodes. For example, the compute node interconnect (108) may be a network (e.g., local area network (LAN), wide area network (WAN)), a shared file, interprocess communication system, backplane, bus, or any other communication system. Further, although FIG. 1 shows the compute node interconnect (108) as being separate from connections between other components of the system, the compute node interconnect (108) may be the same or overlap with the interconnect between other components of the systems.

Continuing with FIG. 1, a user node (110) is a node that is used by a user to initiate a tracing. The user is any individual or entity on whose behalf the end-to-end tracing is performed. As used herein, a user may indirectly perform the end to end tracing using the user node. For example, diagnostic software on the user node may be configured to detect a fault in the system and initiate end-to-end tracing with or without user interaction. Although not shown, the user node (110) may include an interface for communicating with the tracing server node.

Compute nodes (e.g., compute node A (102), compute node B (104), compute node N (106)) and the user node (110) are configured to be communicatively connected to a tracing server node (112). The communicative coupling may be direct, through a network, or via any hardware and/or software another transmission media. Further, the communicative coupling may overlap with the compute node interconnect (108). The tracing server node (112) is hardware, software, and/or firmware that is configured to manage end-to-end tracing across multiple nodes. In one or more embodiments, the tracing server node provides a centralized mechanism for enabling end-to-end tracing across multiple compute nodes. In other words, while multiple tracing server nodes may exist, each of the multiple tracing server nodes may include functionality to enable end-to-end tracing across multiple compute nodes using the providers on the multiple compute nodes.

As shown in FIG. 1, tracing server node (112) includes a data repository (126), and a tracing manager (130) in accordance with one or more embodiments of the invention. In one or more embodiments of the invention, the data repository (126) is any type of storage unit and/or device (e.g., a file system, database, collection of tables, or any other storage mechanism) for storing data. Further, the data repository (126) may include multiple different storage units and/or devices. The multiple different storage units and/or devices may or may not be of the same type or located at the same physical site. The data repository (126) may include a provider repository (231) and a session repository (233). The provider repository (231) and session repository (233) are data repositories, or portions thereof, that include functionality to store provider information and session information, respectively. The provider repository (231) includes provider lists (132). Although the term list is used, list refers to a conceptual structure, and any data structure may be used without departing from the scope of the invention. The provider lists are a mapping between a compute node and the providers on the compute nodes. In particular, the provider list may store a compute node identifier and a provider identifier for each provider on the compute node. The storage may be explicit (e.g., by storing the value of the identifier) or implicit (e.g., by storing Boolean value in an entry of a data structure corresponding to the provider identifier). Thus, with the provider lists, the tracing server node (112) has information about which providers are located on which compute nodes in the system.

The session repository (126) may store session identifiers (134), argument values for the session (not shown), and the provider identifiers (not shown) of providers enabled or to be enabled for the session. A session identifier (134) is an identifier of a session. A session, or tracing session, is a collection of one or more providers enabled for a user. Traces belonging to, or associated with session are generated as a result of enabling the providers for a session. Each session may be associated with a unique identifier of the user. Traces in the session may each be related to a same fault or problem in the system. Each session may have multiple identifiers, such as a user defined identifier and an automated unique identifier. The user defined identifier is an identifier that is presented to the user to uniquely identify the session to the user. For example, the user defined identifier may be a name that the user provides to uniquely identify the session amongst other current sessions of the user. The automated unique identifier is a unique identifier that is unique across sessions of across users. For example, the automated unique identifier may be an alphanumeric identifier that the system uses to unique identify the session. In other words, a session identifier that is assigned to a session is passed from the tracing server to the compute nodes when activating the providers for a session. When events are generated by a compute node, the event reports include the session identifier for which the events were generated. The tracing server, using the session identifier found in received event reports group the event reports by sessions. The user node then uses the session identifier to obtain results from the tracing server for the sessions of the user node.

In one or more embodiments, the tracing manager (130) includes functionality to implement end-to-end tracing. In other words, the tracing manager (130) is hardware, software, and/or firmware logic (128) that includes functionality to authenticate compute nodes and users, receive provider identifiers, activate end-to-end tracing using the providers, receive and combine event reports, and perform other actions related to the tracing management. In one or more embodiments, the tracing interface may include argument fields (136). Argument fields (136) are fields for obtaining values which are specified as part of activating a provider on a compute node, and are used by the providers to enable tracing for specific a specific component of the application. For example, an argument may include one or more provider identifiers and arguments for the providers identified by the provider identifier (e.g., a file system mount point, the internet protocol address of a compute node, or any other argument). Further, each session may have a distinct set of values for arguments stored in the session repository. The fields may be command line fields, graphical user interface widgets or other types of fields for receiving the values of the arguments.

In some embodiments, the nodes are physical devices. As shown in FIG. 2, the system includes a tracing server device (212) having a data repository (226) with provider repository (231), provider lists (232), session repository (233), and session identifiers (234), a tracing manager (230) with logic (228) and argument fields (236). The system further includes compute devices (e.g., compute device A (202), compute device B (204), and compute device N (206)) having respective provider sets (e.g., provider set A (214), provider set B (216) and provider set N (218)) and application sets (e.g., application set A (220) application set B (222), and application set N (224)). The compute devices are connected via a compute device interconnect (208). The system may include or be connected to a user device (210). The tracing server device (212), data repository (226), provider repository (231), provider lists (232), session repository (233), session identifiers (234), a tracing manager (230), logic (228), argument fields (236), compute devices (e.g., compute device A (202), compute device B (204), and compute device N (206)), provider sets (e.g., provider set A (214), provider set B (216) and provider set N (218)), application sets (e.g., application set A (220) application set B (222), and application set N (224)), compute device interconnect (208), and user device (210) may be the same or similar to liked named component in FIG. 1, with the exception that in the embodiment shown in FIG. 2, the nodes are physical devices.

In particular, the nodes are any device and/or any set of devices (e.g., a distributed computing system) capable of electronically processing instructions, serially or in parallel, and that includes at least the minimum processing power, memory, input and output (IO) device(s), operatively connected storage device(s), and/or network connectivity in order to contribute to the performance of at least some portion of the functionality described in accordance with one or more embodiments of the invention. Examples of devices include, but are not limited to, one or more server machines (e.g., a blade server in a blade server chassis), desktop computers, mobile devices (e.g., laptop computer, smartphone, personal digital assistant, tablet computer, and/or any other mobile compute device), any other type of physical device with the aforementioned minimum requirements, and/or any combination of the listed examples.

In one or more embodiments of the invention, a device includes, but is not limited to, hardware, software, firmware, circuitry, integrated circuits, circuit elements implemented using a semiconducting material, registers, memory, and/or any combination thereof, all or a portion of which may include functionality to facilitate execution of instructions (e.g., instructions representing a software program written in any programming language for performing at least a portion of one or more embodiments of the invention).

One or more embodiments include functionality to perform end-to-end tracing that spans multiple physical devices. For example, the end-to-end tracing that monitors the flow and processing of traffic from a client device of a web server, that interfaces with an application server and a storage device. The end-to-end tracing spans the traffic amongst the client device, web server, application server and storage server. Each message passed between devices may use different message passing protocols and different forms of data. Transfer of messages between devices may be performed through various layers of the network protocol stack. The end-to-end tracing manages the tracing across the various layers and devices in accordance with one or more embodiments of the invention.

In some embodiments, the nodes are virtual entities that execute on one or more physical devices. As shown in FIG. 3, the system includes a hardware device (340) that may be connected to a user device (310). The hardware device (340 may include a tracing system (312) having a data repository (326) with provider repository (331), provider lists (332), session repository (333), and session identifiers (334), a tracing manager (330) with logic (328) and argument fields (336). The system further includes compute environments (e.g., compute environment A (302), compute environment B (304), and compute environment N (306)) having respective provider sets (e.g., provider set A (314), provider set B (316) and provider set N (318)) and application sets (e.g., application set A (320) application set B (322), and application set N (324)). The compute environments are connected via a virtual interconnect (308). The system may include or be connected to a user device (310). The tracing system (312), data repository (326), provider repository (331), provider lists (332), session repository (333), session identifiers (334), a tracing manager (330), logic (328), argument fields (336), compute environments (e.g., compute environment A (302), compute environment B (304), and compute environment N (306)), provider sets (e.g., provider set A (314), provider set B (316) and provider set N (318)), application sets (e.g., application set A (320) application set B (322), and application set N (324)), virtual interconnect (308), and user device (310) may be the same or similar to liked named component in FIG. 1, with the exception that in the embodiment shown in FIG. 3, the nodes are virtual environments.

In particular, the nodes may be an independent application, an application suite, an isolated execution environment (e.g., container, virtual machine, etc.). The nodes may execute on a hardware device (340) that is any device and/or any set of devices (e.g., a distributed computing system) capable of electronically processing instructions, serially or in parallel, and that includes at least the minimum processing power, memory, input and output (IO) device(s), operatively connected storage device(s), and/or network connectivity in order to contribute to the performance of at least some portion of the functionality described in accordance with one or more embodiments of the invention. Examples of devices include, but are not limited to, one or more server machines (e.g., a blade server in a blade server chassis), desktop computers, mobile devices (e.g., laptop computer, smartphone, personal digital assistant, tablet computer, and/ or any other mobile compute device), any other type of physical device with the aforementioned minimum requirements, and/or any combination of the listed examples.

In one or more embodiments of the invention, a device includes, but is not limited to, hardware, software, firmware, circuitry, integrated circuits, circuit elements implemented using a semiconducting material, registers, memory, and/or any combination thereof, all or a portion of which may include functionality to facilitate execution of instructions (e.g., instructions representing a software program written in any programming language for performing at least a portion of one or more embodiments of the invention).

One or more embodiments include functionality to perform end-to-end tracing that spans multiple heterogeneous environments. For example, the end-to-end tracing that monitors the flow and processing of traffic from a client device of a web server application, that interfaces with an application server application and a backend storage. The end-to-end tracing spans the traffic amongst the virtual entities even when the entities use different languages, authentication procedures, and are traced using different tracing logic.

Figure 4:
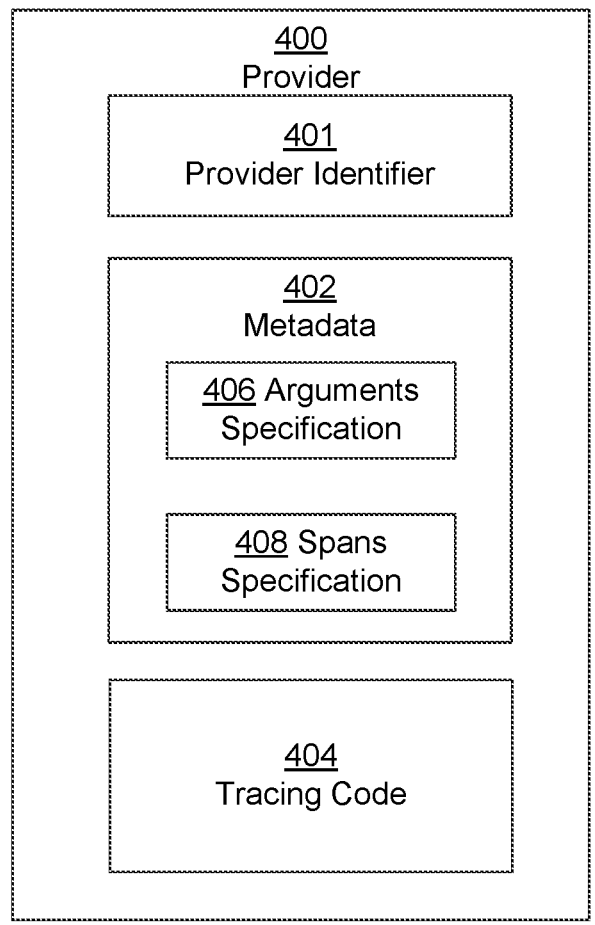

Continuing with the discussion, FIG. 4 shows a schematic diagram of a provider in accordance with one or more embodiments of the invention. Providers allow users interested in tracing to perform end-to-end tracing for common use cases, applications, and protocols. In one or more embodiments, users do not need to have specific knowledge of the compute nodes or applications of the compute nodes. In such embodiments, providers may be changes independently of the information provided by the providers. As shown in FIG. 4, the provider (400) includes a provider identifier (401), tracing code (404), and metadata (402).

The provider identifier (401) may be the same or similar to the provider identifier discussed above with reference to FIG. 2.

The metadata (402) is data describing the provider. In particular, the metadata (402) includes an arguments specification (406) and a spans specification (408). The arguments specification (406) describes the arguments used by the provider to perform the tracing. For example, the arguments may specify whether the provider is monitoring a client or a server, the provider identifier of the providers, and other information. The spans specification (408) provides a mapping between the spans supported by a provider and the events generated by the agents in accordance with one or more embodiments of the invention. An event is an action performed by a compute node. A span is demarcated by a start event and an end event. The start event of a span is a start of the span. The end event of a span is the end of the span. For example, for a span that monitors execution of a loop of instructions, the start event may be when the processor enters the loop of instructions and the end event may be when the loop is exited. By way of another example, the start event may be the start of processing an outgoing packet and the end event may be the end of the packet processing. In one or more embodiments of the invention, each span supported by the provider is separately defined in the span specification. In other words, for a span definition in the span specification, the event type that triggers the start of the span, the event type that triggers the end of the span, and the name of the span are defined. An event type is an identifier of a set of events matching the event type (e.g., transmitted request, receiving a reply, start of an operation, etc.).

The tracing code (404) is computer readable instructions that performs tracing. For example, the tracing code may include functionality to call a tracing application programming interface of one or more agents. The agents may enable probes in the application. In some embodiments, the tracing code may directly trace the application and operations on the compute node. For example, the tracing code may be a DTrace Script. Various technologies for tracing may be used as the tracing code without departing from the scope of the invention.

While FIGS. 1-4 shows a configuration of components, other configurations may be used without departing from the scope of the invention. For example, various components may be combined to create a single component. As another example, the functionality performed by a single component may be performed by two or more components. Additionally, there may be any number of compute nodes, storage devices, network devices, tracing servers, and/or other devices, each of which is operatively connected all other devices, or any portion thereof, via any type of connection (e.g., directly attached, network connected, etc.). Accordingly, for at least the above-recited reasons, embodiments of the invention should not be considered limited to the specific arrangements of devices and elements shown in FIGS. 1-4.

Figure 5:
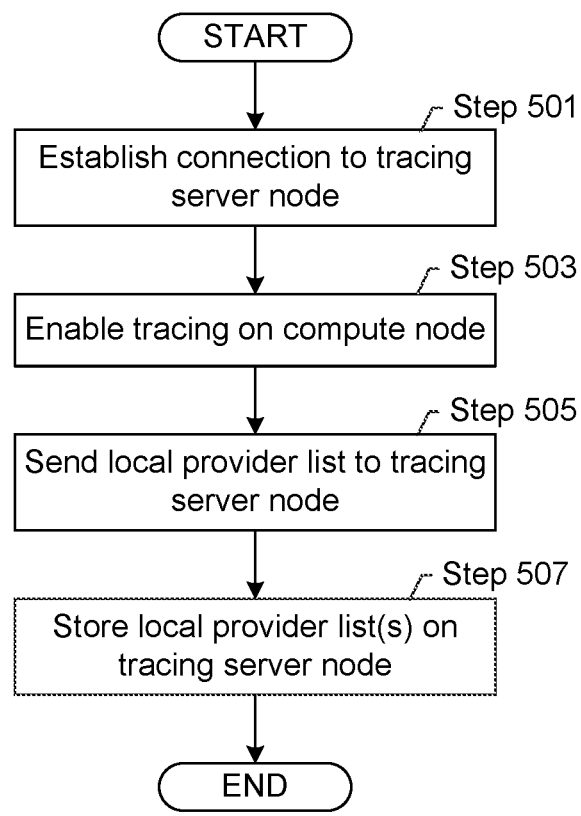
FIGS. 5, 6, and 7 show flowcharts in accordance with one or more embodiments of the invention.
Figures 6, 7:
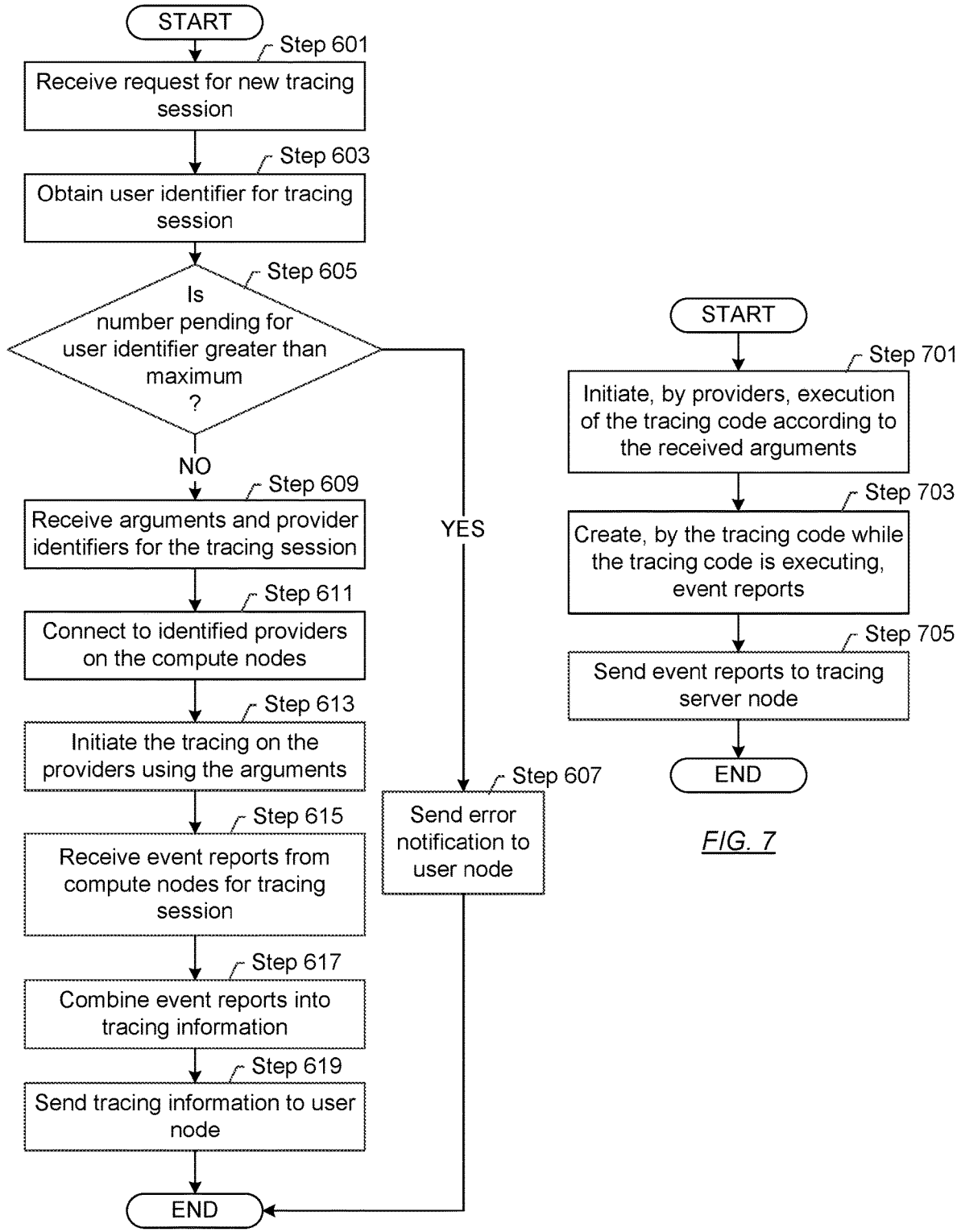

FIGS. 5, 6, and 7 show flowcharts in accordance with one or more embodiments of the invention. While the various steps in these flowchart are presented and described sequentially, one of ordinary skill having benefit of this disclosure will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 5 shows a flowchart for preparing a compute node for tracing in accordance with one or more embodiments of the invention. In Step 51, a connection to the tracing server node is established in accordance with one or more embodiments of the invention. In one or more embodiments, the provider or a client on the compute node send a notification to the tracing server node to start authentication. In one or more embodiments, the authentication is performed without user interaction. User interaction may be used for authentication without departing from the scope of the invention. In some embodiments, the tracing server node has a root account that perform secure shell (SSH) authentication with the compute node. On the tracing server node, the tracing server node may have a tracing node account for the compute node, where the tracing node account provides credentials only for tracing in accordance with one or more embodiments of the invention.

Prior to authentication, the compute node's public key stored on the tracing server node in an authorized node file and the tracing server node's public key on the compute node in an authorized node file. For authentication, each node uses their respective private keys to encrypt a message, respectively, and then sends the message to the other party. The other party (i.e., compute node, tracing server node) decrypts the message using the public key stored on the node and compares the decrypted message with a predefined message. If accurate, the node is authenticated. Other techniques for performing authentication may be used without departing from the scope of the invention.

In Step 503, tracing is enabled on the compute node in accordance with one or more embodiments of the invention. For example, tracing providers and tracing agents may be instantiated.

In Step 505, a local provider list is transmitted to the tracing server node. As discussed above, the local provider list is a provider list of providers on the compute node. In general, each compute node may transmit a local provider list of the providers on the respective compute node. The compute node generates the local provider list on the compute node by listing providers using the provider identifiers. The provider list may be generated on demand or pre-stored in a data repository on the compute node. The compute node may then send the local provider list to the tracing server node.

In Step 507, the tracing server node stores the local provider list in accordance with one or more embodiments of the invention. In one or more embodiments of the invention, the tracing server node may relate each provider identifier with the corresponding compute node identifier. For example, if compute node 1 sent local provider list with provider B to the tracing server node, then tracing server node creates a stored relationship between compute node 1 and provider B. The tracing server node may create a relationship for each provider compute node pair, where the provider is on the corresponding compute node. Using the relationship, the tracing server node may initiate end to end tracing across the compute nodes.

FIG. 6 shows a flowchart for tracing using a tracing server node in accordance with one or more embodiments of the invention. In Step 601, a request for a new tracing session is received in accordance with one or more embodiments of the invention. For example, a user node may transmit to the tracing server node the request to initiate a new session. Further, as discussed above, a session is a collection of related traces. Thus, although not shown, a user node may send a request to activate additional provider(s) for an existing session. By way of another example, the tracing server node may add the additional providers to an existing session without prior user request. In such a scenario, the flow may start in Step 609.

Continuing with FIG. 6, in Step 603, a user identifier is obtained for the tracing session in accordance with one or more embodiments of the invention. The user identifier may be obtained from the request. Using the user identifier, a determination is made whether the number of sessions pending for the user identifier is greater than a maximum number of sessions in Step 605 in accordance with one or more embodiments of the invention. The tracing server node may compare the number of tracing session open for the user with the maximum number allotted to the user. If the number pending is greater than the maximum number, the flow may proceed to Step 607. In Step 607, an error notification may be sent to the user node. For example, the tracing server node may send the error message to the tracing server node.

Continuing with FIG. 6, in Step 609, arguments and one or more provider identifiers are received for the tracing session in accordance with one or more embodiments of the invention. The arguments and/or provider identifier(s) may be received separately or with the request for the tracing session. For example, the request may include one or more arguments, such as provider identifiers, compute node identifiers, and/or other arguments.

In Step 611, the tracing server node connects to the identified providers on the compute nodes in accordance with one or more embodiments of the invention. For example, the tracing server node may establish a communication session with the providers identified with the provider identified on the identified compute nodes. Establishing a communication session may be performed using authentication discussed above with reference to FIG. 5. By way of another example, the tracing server node may use an existing communication session.

In Step 613, the tracing server node initiates tracing on the providers using the arguments in accordance with one or more embodiments of the invention. For example, the tracing server node may send a message to the identified providers according to the API. The message may include arguments according to the arguments in the tracing request. By initiating tracing from the tracing server node, the tracing may span the entire flow of traffic between the compute nodes and processing on the compute nodes using the single request in accordance with one or more embodiments of the invention. Thus, the cause of a failure in the system may be more easily identified through the original tracing request. Further, in one or more embodiments, the providers abstract out the underlying tracing. In other words, the providers may be initiated without needing an understanding of the tracing technologies used to perform the tracing. Based on initiating the tracing on the providers, the providers initiate tracing on the respective nodes. Performing tracing on the nodes is discussed below with reference to FIG. 7.

In particular, as shown in FIG. 7, the providers initiate execution of the tracing code according to the received arguments in Step 701. For example, the tracing code on the providers may issue a call using the tracing API to one or more agents that monitor execution. In Step 703, while the tracing code is executing, the tracing code creates event reports in accordance with one or more embodiments of the invention. In other words, the tracing code detects events. Start and end events matching a span are mapped to a span identifier for the span as specified by the span specification. Statistics may be generated for the span. The statistics, start time, end time, span identifier, and/or other information may be grouped into an event report. In Step 705, the event reports are sent to the tracing server node in accordance with one or more embodiments of the invention. In one or more embodiments of the invention, as each event is detected and event reports created, the event reports may be transmitted to the tracing server node. In other embodiments, event reports may be transmitted in batch.

Returning to Step 615 of FIG. 6, on the tracing server node, the event reports are received from the compute nodes for the tracing session. In other words, messages are received from the compute nodes.

In Step 617, the event reports are combined into tracing information. Individual events correspond to a node in a trace, the event reports are assembled into a trace. In other words, the trace stores a sequence of events that captures the execution of an operation spanning multiple compute nodes. In other words, the trace represents the execution across the multiple compute nodes as reflected by the sequence of events. The tracing server node may assemble the traces and generates statistics about the traces. The tracing information may be the statistics and/or the traces. By way of an example of assembling traces, the tracing server node may use the session identifier to associate the event reports with each other. Combining event reports may be performed as discussed in U.S. patent application Ser. No. 14/983,014, which is incorporated herein by reference in its entirety. Other techniques for combining event reports may be used without departing from the scope of the invention.

In Step 619, the tracing information is transmitted to the user node in accordance with one or more embodiments of the invention. In one or more embodiments, the tracing information may be transmitted in response to a subsequent request of the user node. In one or more embodiments, the tracing information may be transmitted as an alert. The user node may present the tracing information to a system administrator to correct a fault in the system. Alternatively, debugging software may analyze the tracing information and correct the fault without user interaction.

Although not shown in FIG. 6, a user node may send a request to list open sessions and delete one or more sessions. The tracing server node responds to the user at least with the user defined identifier for the open session. The tracing server node may also respond with an automated session identifier.

Figure 8:
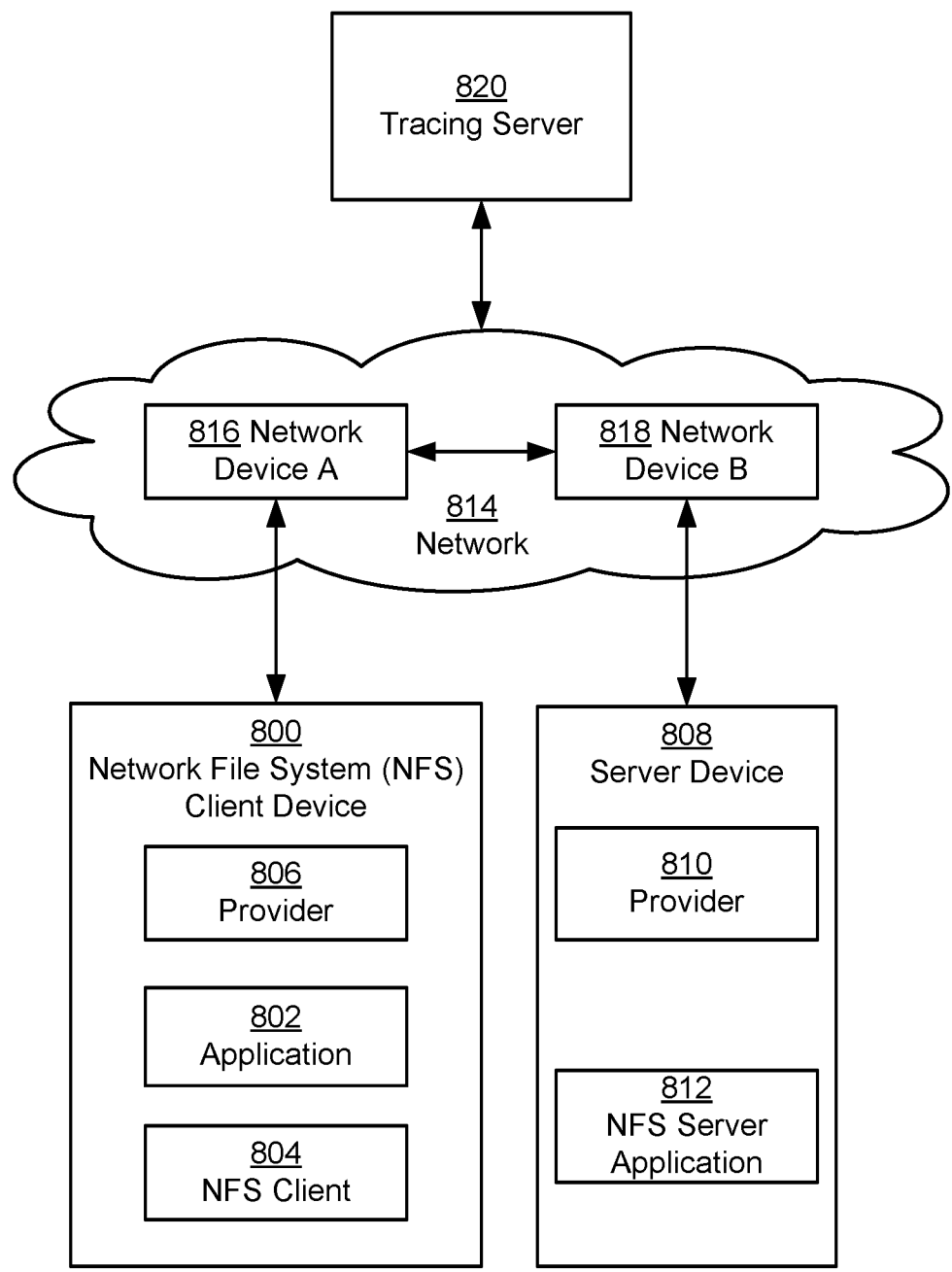
FIG. 8 shows an example in accordance with one or more embodiments of the invention.

The following example is for explanatory purposes only and not intended to limit the scope of the invention. FIG. 8 shows an example for end to end tracing in accordance with one or more embodiments of the invention. In the example, consider a scenario in which a network administrator receives an error report from a customer stating that the customer is having difficulty accessing a network file system (NFS). Thus, the network administrator does not know whether the fault is on the customer's device or another device in the system. FIG. 8 shows the example system on which end to end tracing may be performed. As shown in FIG. 8, the system may include a NFS client device (800), which may include an application (802), an NFS client (804), and a provider (806). The NFS client device (802) may be operatively connected to a NFS server device (808) that includes a provider (810) and NFS server application (812). The connection may be via a network (814) that includes some number of network devices (816, 818). Also connected to the network (814) is a tracing server device (820).

The providers (806, 810) may have the following metadata.

```
{
"description": "NFSv4 operations",
"copyright": "Copyright (c) 2015, Oracle and/or its affiliates. All rights reserved.",
"arguments": [
    {
    "role": true,
    "required": true,
    "type": "host",
    "name": "client"
    },
```

```
{
    "role": true,
    "required": true,
    "type": "host",
    "name": "server"
},
{
    "type": "string",
    "name": "filesystem"
}
],
"spans": [
    {
        "begin": "nfs4-client/op-start",
        "end": "nfs4-client/request-transmitted",
        "name": "client-preprocess"
    },
    {
        "begin": "nfs4-client/request-transmitted",
        "end": "nfs4-server/op-start",
        "name": "network-request"
    },
    {
        "begin": "nfs4-server/op-start",
        "end": "nfs4-server/op-finished",
        "name": "server-process"
    },
    {
        "begin": "nfs4-server/op-finished",
        "end": "nfs4-client/reply-received",
        "name": "network-reply"
    },
    {
        "begin": "nfs4-client/reply-received",
        "end": "nfs4-client/op-finished",
        "name": "client-postprocess"
    }
],
"$schema": ":provider",
"name": "nfs4"
}
```

In the above example, the metadata indicates the provider expects to receive, as arguments, an identifier of the compute node corresponding to the client (e.g., the identifier of NFS client device (800)), an identifier of the compute node corresponding to the server (e.g., identifier of server device (810)), and the name of the file system. The metadata also lists spans. For each span in the list of spans, "begin" indicates the event that is the start of the span, "end" is the event that lists the end of the span, and "name" is the name of the span that is sent to the tracing server device (820).

In order to perform the tracing, the network administrator sends a request to the tracing server device to create a new tracing session. The request includes the client device identifier, server device identifier, provider identifier, and a name of a session. In response to a request to create a tracing session from the network administrator, the tracing server device issues a call to the providers (806, 810) with the arguments specified by the network administrator.

The tracing server device may publish with the following statistics.

```
:class.etrace:res.session/root@test-session/span:client-
    postprocess:stat.latency-average
:class.etrace:res.session/root@test-session/span:client-
    postprocess:stat.latency-std-deviation
:class.etrace:res.session/root@test-session/span:client-
    preprocess:stat.latency-average
class.etrace:res.session/root@test-session/span:client-
    preprocess:stat.latency-std-deviation
:class.etrace:res.session/root@test-session/span:network-reply:stat.latency-
    average
:class.etrace:res.session/root@test-session/span:network-reply:stat.latency-
    std-deviation
:class.etrace:res.session/root@test-session/span:network-
    request:stat.latency-average
:class.etrace:res.session/root@test-session/span:network-
    request:stat.latency-std-deviation
:class.etrace:res session/root@test-session/span:server-process:stat.latency-
    average
:class.etrace:res.session/root@test-session/span:server-process:stat.latency-
    std-deviation
Read a statistic
# sstore capture :class.etrace:res.session/root@test-session/span:network-
    request:stat.latency-average 6
TIME VALUE IDENTIFIER
2016-02-18T14:59:18 379113676 :class.etrace:res.session/root@test-
    session/span:network-request:stat.latency-average
2016-02-18T14:59:24 380471333 :class.etrace:res.session/root@test-
    session/span:network-request:stat.latency-average
2016-02-18T14:59:30 379561785 :class.etrace:res.session/root@test-
    session/span:network-request:stat.latency-average
```

In particular, the application (802) is instrumented to initiate a trace when the application seeks to perform a read of data from storage. The storage device storing the data the application seeks to read is operatively connected to the NFS server. Accordingly, the application engages the NFS client (804) to start the read, and a first event, nfs4-client/op-start, is generated with a trace identifier TID-01, an event identifier EID-01, and a timestamp T-01. The agent executing on the NFS client device then creates a first event report for the NFS client-start read event and transmits the first event report to the tracing server.

The NFS client (804) then forms the read request to be sent to the NFS server. When the read request is formed and passed to the network stack, a second event, nfs4-client/request-transmitted, is generated with a trace identifier TID-01, an event identifier EID-02, an ancestor event ID of EID-01 (which corresponds to nfs4-client/op-start) and a timestamp T-02. The server device (808) receives the request. Because the provider (810) has enabled the tracing on the NFS server application (812), the NFS server application (812) performs the tracing and may send similar event reports as the client to the tracing server device. Visualization software may present the statistics to the network administrator. Thus, with the single request, the network administrator may be able to identify the location of failure of the system and correct the customer's problem.

Embodiments of the invention may be implemented on a computing system. Any combination of mobile, desktop, server, router, switch, embedded device, or other types of hardware may be used. For example, as shown in FIG. 9.1, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (900) in FIG. 9.1 may be connected to or be a part of a network. For example, as shown in FIG. 9.2, the network (920) may include multiple nodes (e.g., node X (922), node Y (924)). Each node may correspond to a computing system, such as the computing system shown in FIG. 9.1, or a group of nodes combined may correspond to the computing system shown in FIG. 9.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (900) may be located at a remote location and connected to the other elements over a network.

Although not shown in FIG. 9.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system shown in FIG. 9.1. Further, the client device (926) may include and/or perform all or a portion of one or more embodiments of the invention.

The computing system or group of computing systems described in FIGS. 9.1 and 9.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention.

The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or another protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 9.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 9.1, while performing one or more embodiments of the invention, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 9.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 9.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 9.1 and the nodes and/or client device in FIG. 9.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for end-to-end tracing, the method comprising:
receiving, from a user node, a request for a tracing session, the request comprising an argument and a provider identifier for the tracing session;
obtaining a user identifier for the request;
determining that a number of pending tracing sessions for the user identifier is less than a maximum number of allotted tracing sessions for the user identifier;
in response to determining that the number of pending tracing sessions is less than the maximum number of allotted tracing sessions, initiating tracing of at least one application executing on a plurality of compute nodes by sending the argument to a provider identified by the provider identifier, the provider located on each of the plurality of compute nodes,
wherein the provider issues a call to an agent that enables a plurality of probes in the at least one application, and
wherein the provider comprises a spans specification comprising a predefined start event type that triggers a start of a span and a predefined end event type that triggers an end of the span;
receiving a plurality of event reports from the plurality of compute nodes;
combining the plurality of event reports into a tracing information for the tracing session; and
sending the tracing information to the user node.

2. The method of claim 1, wherein the provider located on each of the plurality of compute nodes initiates execution of a tracing code on the plurality of compute nodes, wherein the tracing code monitors execution on a local compute node of the plurality of compute nodes.

3. The method of claim 1, further comprising:
establishing a connection to the tracing server node;
enabling a tracing on a local compute node of the plurality of compute nodes; and
sending a local provider list to the tracing server node, the local provider list listing providers on the local compute node, wherein the tracing server node stores the local provider list.

4. The method of claim 1, wherein the argument comprises an identifier of each compute node of the plurality of compute nodes.

5. The method of claim 1, wherein the plurality of compute nodes is a plurality of distinct devices.

6. The method of claim 1, wherein the plurality of compute nodes is a plurality of computing environments on a computing device.

7. The method of claim 1, wherein the provider comprises arguments specification specifying the argument and tracing code.

8. A system for end-to-end tracing, the system comprising:
a computer processor;
a data repository for storing a plurality of provider lists;
instructions for causing the computer processor to:
receive, from a user node, a request for a tracing session, the request comprising an argument and a provider identifier for the tracing session;
obtaining a user identifier for the request;
determine that a number of pending tracing sessions for the user identifier is less than a maximum number of allotted tracing sessions for the user identifier;
in response to determining that the number of pending tracing sessions is less than the maximum number of allotted tracing sessions, initiate tracing of at least one application executing on a plurality of compute nodes by sending the argument to a provider identified by the provider identifier, the provider located on each of the plurality of compute nodes,
wherein the provider issues a call to an agent that enables a plurality of probes in the at least one application, and
wherein the provider comprises a spans specification comprising a predefined start event type that triggers a start of a span and a predefined end event type that triggers an end of the span;
receive a plurality of event reports from the plurality of compute nodes;
combine the plurality of event reports into a tracing information for the tracing session; and
send the tracing information to the user node.

9. The system of claim 8, wherein the instructions further cause the computer processor to:
establish a connection with the plurality of compute nodes; and
receive the plurality of provider lists from each of the plurality of compute nodes; and
store the plurality of provider lists.

10. The system of claim 8, wherein the argument comprises an identifier of each compute node of the plurality of compute nodes.

11. The system of claim 8, wherein the plurality of compute nodes is a plurality of distinct devices.

12. The system of claim 8, wherein the plurality of compute nodes is a plurality of computing environments on a computing device.

13. The system of claim 8, wherein the instructions further cause the computer processor to:
   obtain a user identifier for the request; and
   determine that a number of pending tracing sessions for the user identifier is less than a maximum number of allotted tracing sessions for the user identifier,
   wherein the tracing is initiated on the plurality of compute nodes based on the number of pending tracing sessions being less than the maximum number of allotted tracing sessions.

14. A non-transitory computer readable medium for end-to-end tracing, the non-transitory computer readable medium comprising computer readable program code for:
   receiving, from a user node, a request for a tracing session, the request comprising an argument and a provider identifier for the tracing session;
   obtaining a user identifier for the request;
   determining that a number of pending tracing sessions for the user identifier is less than a maximum number of allotted tracing sessions for the user identifier;
   in response to determining that the number of pending tracing sessions is less than the maximum number of allotted tracing sessions, initiating tracing of at least one application executing on a plurality of compute nodes by sending the argument to a provider identified by the provider identifier, the provider located on each of the plurality of compute nodes,
      wherein the provider issues a call to an agent that enables a plurality of probes in the at least one application, and
      wherein the provider comprises a spans specification comprising a predefined start event type that triggers a start of a span and a predefined end event type that triggers an end of the span;
   receiving a plurality of event reports from the plurality of compute nodes;
   combining the plurality of event reports into a tracing information for the tracing session; and
   sending the tracing information to the user node.

15. The non-transitory computer readable medium of claim 14, wherein the provider located on each of the plurality of compute nodes initiates execution of a tracing code on the plurality of compute nodes, wherein the tracing code monitors execution on a local compute node of the plurality of compute nodes.

16. The non-transitory computer readable medium of claim 14, wherein the argument comprises an identifier of each compute node of the plurality of compute nodes.

17. The non-transitory computer readable medium of claim 14, wherein the plurality of compute nodes is a plurality of distinct devices.

18. The non-transitory computer readable medium of claim 14, wherein the plurality of compute nodes is a plurality of computing environments on a computing device.

19. The non-transitory computer readable medium of claim 14, further comprising computer readable program code for:
   obtaining a user identifier for the request; and
   determining that a number of pending tracing sessions for the user identifier is less than a maximum number of allotted tracing sessions for the user identifier,
   wherein the tracing is initiated on the plurality of compute nodes based on the number of pending tracing sessions being less than the maximum number of allotted tracing sessions.

* * * * *